(12) United States Patent
Kanai et al.

(10) Patent No.: US 6,961,788 B2
(45) Date of Patent: Nov. 1, 2005

(54) DISK CONTROL DEVICE AND CONTROL METHOD THEREFOR

(75) Inventors: Hiroki Kanai, Odawara (JP); Seiji Kaneko, Zama (JP)

(73) Assignee: Hitachi, Ltd., Tokyo (JP)

( * ) Notice: Subject to any disclaimer, the term of this patent is extended or adjusted under 35 U.S.C. 154(b) by 103 days.

(21) Appl. No.: 10/379,087

(22) Filed: Mar. 3, 2003

(65) Prior Publication Data

US 2003/0204649 A1 Oct. 30, 2003

(30) Foreign Application Priority Data

Apr. 26, 2002 (JP) ........................................ 2002-126885

(51) Int. Cl.⁷ ............................................. G06F 13/00
(52) U.S. Cl. ............................. 710/36; 710/52; 710/74; 711/4; 711/111; 711/118; 711/154; 714/6
(58) Field of Search ........................ 710/36–45, 52–57, 710/74, 316; 711/4, 111–114, 118–121; 714/6–8, 154

(56) References Cited

U.S. PATENT DOCUMENTS

| | | | | |
|---|---|---|---|---|
| 4,780,808 A | * | 10/1988 | Moreno et al. ................. | 711/4 |
| 4,989,205 A | * | 1/1991 | Dunphy et al. ................. | 714/6 |
| 4,989,206 A | * | 1/1991 | Dunphy et al. ................. | 714/7 |
| 5,155,845 A | * | 10/1992 | Beal et al. ..................... | 714/6 |
| 5,371,855 A | * | 12/1994 | Idleman et al. ................. | 711/113 |
| 5,574,950 A | * | 11/1996 | Hathorn et al. | |
| 5,771,367 A | * | 6/1998 | Beardsley et al. .......... | 711/162 |
| 5,848,241 A | * | 12/1998 | Miisinai et al. | |
| 6,073,218 A | * | 6/2000 | DeKoning et al. .......... | 711/150 |
| 6,094,728 A | * | 7/2000 | Ichikawa et al. .............. | 714/6 |
| 6,330,642 B1 | * | 12/2001 | Carteau ...................... | 711/114 |
| 6,385,681 B1 | * | 5/2002 | Fujimoto et al. ........... | 710/316 |
| 6,438,629 B1 | * | 8/2002 | Huebner et al. | |
| 6,636,934 B1 | * | 10/2003 | Linnell et al. | |
| 6,640,281 B2 | * | 10/2003 | Obara et al. ................. | 711/114 |
| 6,647,474 B2 | * | 11/2003 | Yanai et al. ................. | 711/162 |
| 6,721,857 B2 | * | 4/2004 | Cochran et al. ............ | 711/147 |
| 6,745,287 B2 | * | 6/2004 | Fujimoto et al. ........... | 711/114 |
| 6,757,792 B2 | * | 6/2004 | Morishita et al. ........... | 711/154 |
| 2002/0065984 A1 | * | 5/2002 | Thompson et al. | |
| 2002/0087751 A1 | * | 7/2002 | Chong, Jr. | |
| 2003/0200377 A1 | * | 10/2003 | Fujimoto et al. | |
| 2004/0010639 A1 | * | 1/2004 | Inoue | |

FOREIGN PATENT DOCUMENTS

| | | |
|---|---|---|
| JP | 61-187060 | * 8/1986 |
| JP | 07-261946 | 10/1995 |
| JP | 08-022379 | 1/1996 |
| JP | 10-069357 | 3/1998 |
| JP | 2000-099281 | 4/2000 |
| JP | 2000-267815 | 9/2000 |
| JP | 2001-256003 | 9/2001 |
| JP | 2001-290790 | * 10/2001 |
| JP | 2001-306265 | * 11/2001 |
| JP | 2002-123479 | 4/2002 |
| JP | 2003-173295 | * 6/2003 |

OTHER PUBLICATIONS

IBM Technical Disclosure Bulletin vol. 24, No. 11A, Apr. 1982.

* cited by examiner

Primary Examiner—Christopher B. Shin
(74) Attorney, Agent, or Firm—Townsend and Townsend and Crew LLP

(57) ABSTRACT

A disk control device of the present invention comprises a plurality of disk control units. Each disk control unit includes: at least one channel controller having an interface to a host computer; at least one disk controller having an interface to a disk device; and an internal coupling for connecting the channel controller, the disk controller, and a cache memory for temporarily storing data to be written to or read from the disk device. The disk control device further comprises: a first coupling unit for connecting the internal coupling of each disk control unit to read or write data within the disk control device; and a second coupling unit for connecting the internal coupling of each disk control unit to transfer data between a plurality of the disk control devices.

16 Claims, 15 Drawing Sheets

| DESTI-NATION CM ADDRESS | SOURCE CM ADDRESS | TRANS-FER LENGTH | COMMAND NAME Read |

FIG. 6A

| DESTI-NATION CM ADDRESS | SOURCE CM ADDRESS | TRANS-FER LENGTH | DATA |

FIG. 6B

| DESTI-NATION CM ADDRESS | SOURCE CM ADDRESS | TRANS-FER LENGTH | STATUS INFO. |

FIG. 6C

| DESTI-NATION PROCESSOR ADDRESS | SOURCE PROCESSOR ADDRESS | TRANS-FER LENGTH | COMMAND: TRANSFER REQUEST |

FIG. 8A

| DESTI-NATION PROCESSOR ADDRESS | SOURCE PROCESSOR ADDRESS | TRANS-FER LENGTH | COMMAND: TRANSFER. PERMIT |

FIG. 8B

| DESTI-NATION PORT ADDRESS | SOURCE PORT ADDRESS | TRANS-FER LENGTH | COMMAND: Write | LOGICAL ADDRESS | TRANS-FER SIZE |

FIG. 11A

| DESTI-NATION PORT ADDRESS | SOURCE PORT ADDRESS | TRANS-FER LENGTH | DATA |

FIG. 11B

| DESTI-NATION PORT ADDRESS | SOURCE PORT ADDRESS | TRANS-FER LENGTH | STATUS INFO. |

FIG. 11C

DISK CONTROL DEVICE AND CONTROL METHOD THEREFOR

CROSS REFERENCE TO RELATED APPLICATIONS

The present application claims priority upon Japanese Patent Application No. 2002-126885 filed Apr. 26, 2002, which is herein incorporated by reference.

BACKGROUND OF THE INVENTION

1. Field of the Invention

The present invention relates to a disk control system, a disk control device, and a disk system, and a control method for a disk control device.

2. Description of the Related Art

The I/O performance of a disk subsystem which uses magnetic disks as its storage medium is inferior to that of a main memory of a computer which uses a semiconductor storage device as its storage medium by a difference of approximately 3 to 4 digits. Efforts have been made to reduce this difference in performance, that is, to enhance the I/O performance of subsystems. One way of enhancing the I/O performance of a disk subsystem is to configure the disk subsystem such that it is structured of a plurality of magnetic disk devices and data is stored in these magnetic disk devices. Such a system is referred to as a "disk system".

Such a technique is disclosed in Japanese Patent Application Laid-open Publication No. 2001-256003. In the technique illustrated in FIG. 4 of this publication, a host computer 50 is indirectly connected to all disk control devices 4 through an interconnection network that uses a switch.

However, in order to collectively operate a plurality of disk control devices as a single disk control device, the switch configuring the interconnection network would have to be provided with a map indicating which one of the plurality of disk control devices connected to the switch stores the data. The switch must also have functions to comprehend the command contained in an access request having been transmitted from a host computer and to specify the disk control device storing the requested data. This requires not only the channel interfaces to perform the command comprehension but also the switches connected to the channel interfaces to perform the command comprehension. As a result, the performance will be reduced, as compared with the case in which the host computer is directly connected to the disk control devices.

To address the above problems, the aforementioned Japanese Patent Application Laid-open Publication No. 2001-256003 proposes a configuration in which all shared memories or all cache memories can be accessed from all channel interfaces and disk interfaces through the interconnection network, as shown in FIG. 1 and FIG. 8 of the publication.

According to such a technique, it is possible to provide a disk control device that has a scalable configuration and can be applied to small-scale to super-large-scale configurations with a single architecture with high-reliability and high-performance.

However, the aforementioned technique has not yet been able to provide sufficient efficiencies of data transfer and read/write process. In some cases, the efficiency of the interconnection network is reduced to 50% or less due to occurrence of logical access contention. To solve this problem, it would be necessary to employ a broader bandwidth, which would lead to increased cost.

SUMMARY OF THE INVENTION

The present invention has been devised in view of the above problems, and an object of the present invention to provide a disk control system, a disk control device, and a disk system, and a control method therefor.

To accomplish the above object, a disk control system according to one aspect of the present invention comprises: a plurality of disk control devices, each of the disk control devices including a plurality of disk control units and at least one first coupling unit; and at least one second coupling unit provided between the disk control devices. Each of the disk control units includes: at least one channel controller having an interface to a host computer; at least one disk controller having an interface to a disk device; and an internal coupling for connecting the channel controller, the disk controller, and a cache memory for temporarily storing data to be written to or read from the disk device. The first coupling unit connects the internal couplings of the disk control units provided in the same disk control device to read or write data within the same disk control device. The second coupling unit connects the internal couplings of the disk control units provided in the other disk control devices to transfer data between the plurality of disk control devices.

Other features of the present invention disclosed in this application will become apparent from the following description of preferred embodiments of the present invention and the accompanying drawings.

The present invention can, for example, enhance scalability as well as efficiency of data transfer and read/write processing while keeping the cost low.

BRIEF DESCRIPTION OF THE DRAWINGS

Preferred embodiments of the present invention will now be described in conjunction with the accompanying drawings, in which:

FIG. 6 is a diagram showing a structure of data received/transmitted by the SW 5 according to the embodiment;

FIG. 8 is a diagram showing a structure of data transferred by the SW 6 according to the embodiment;

FIG. 11 is a diagram showing a structure of data transferred by the SW 6 according to the embodiment;

FIG. 13 shows an SW 5 according to another embodiment of the present invention and conventional art, wherein

DETAILED DESCRIPTION OF THE INVENTION

Figure 1:
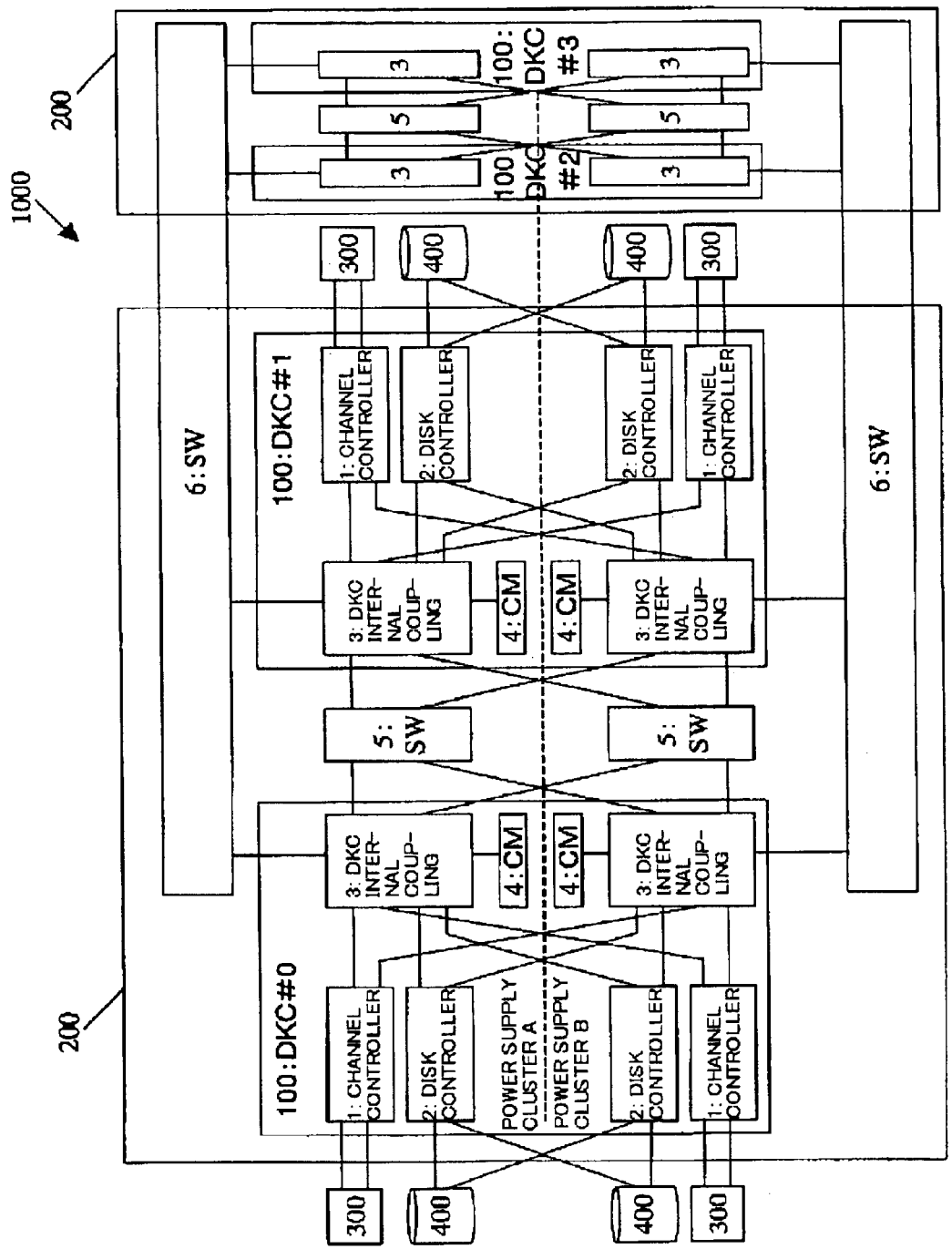
FIG. 1 is a block diagram showing the configuration of a disk system according to an embodiment of the present invention.

At least the following matters will be made clear by the explanation in the present specification and the description of the accompanying drawings.

In the disk control system according to another aspect of the present invention, the number of the disk control units that each of the disk control devices comprises may be two; and the first coupling unit may connect the internal couplings of the two disk control units.

Further, the first coupling unit, the second coupling unit, or both of the first coupling unit and the second coupling unit may be structured using a memory path switch.

Still further, the first coupling unit may be structured using data transmission cables.

Still further, the first coupling unit may connect the disk control units that are provided in the same disk control device and are energized by a shared power supply.

Still further, the first coupling units provided in each of the disk control devices may be connected to transfer data between the disk control devices.

Embodiments of the present invention will be described with reference to the accompanying drawings. A disk control system 1000 comprises a plurality of disk control devices 200. Each disk control device 200 includes a plurality of, preferably two, disk control units 100 (referred to also as DKCS). The disk control system 1000 shown in FIG. 1 includes DKCs No. 0 through No. 3.

Each disk control unit 100 comprises channel controllers 1, disk controllers 2, and DKC internal couplings (or internal couplings) 3. For example, each of the DKC internal couplings 3 is structured of an interconnection network. Each of the channel controllers 1 has an interface to a host computer 300. Each of the disk controllers 2 has an interface to a disk device 400. Each DKC internal coupling 3 interconnects the channel controllers 1, the disk controllers 2, and a cache memory (CM) 4, which is capable of temporarily storing data to be written to or read from the disk devices 400.

Furthermore, to provide a redundant configuration to cope with failures, the disk control units 100 have a duplex configuration in which "power supply clusters" A and B form a pair. Each of the "power supply clusters" A and B comprises a channel controller 1, a disk controller 2, and a DKC internal coupling 3 and is energized by distinct power supplies. The DKC internal coupling 3 in one power supply cluster is connected to the channel controller 1 and the disk controller 2 in the other power supply cluster and further connected to the SW 5 on the other power supply cluster side. The disk controller 2 in one power supply cluster is also connected to the disk device 400 on the other power supply cluster side.

Each disk control device 200 includes SWs (switches) 5 (first coupling units) for interconnecting the DKC internal couplings 3 of the disk control units 100 in the disk control device. In each disk control device 200, one disk control unit 100 accesses the cache memories 4 in the other disk control unit 100 through the SWs 5 to carry out ordinary accessing such as data read/write.

The SW 5 may be structured using a "memory path switch" formed by an LSI, etc. In this case, a shared power supply box is provided to supply power to all of the disk control units 100 within a disk control device 200. Use of memory path switches made up of an LSI, etc. may reduce cost.

Alternatively, the SW 5 may be made up of data transmission cables. Such a configuration may be employed in a situation where a power supply box is provided individually for each disk control unit 100 in each disk control device 200 to independently supply power to the control unit 100. Independent supply of power to the disk control units 100 makes it possible to realize a configuration that can withstand power shutdown.

Furthermore, the disk control system 1000 includes switches (SWs) 6 (second coupling units) for interconnecting the DKC internal couplings 3 of the control units 100 of a plurality of disk control devices 200 (i.e., bridging between the disk control devices 200). The disk control units 100 can access a cache memory 4 provided in another disk control device 200 through the SWs 6 to transfer data. It should be noted that the SW 6 may be configured using a memory path switch. Such a configuration may be employed in a situation where a shared power supply box is provided to supply power to the disk control units 100 of all disk control devices 200 in the disk control system 1000. Use of memory path switches made up of an LSI, etc. may reduce cost.

As a variation of the above configuration, instead of using the switches (SWs) 6, the DKC internal couplings 3 of the control units 100 may be connected to each other by interconnecting the SWs 5 for the disk control units 100 in one disk control device 200 to those in another so as to carry out ordinary access and data transfer processing. In this case, the switches (SWs) 6 do not have to be provided, and thus, a simplified system configuration can be realized.

Furthermore, the interconnection network configuring the SWs 5 and the SWs 6a may be a network such as a LAN (Local Area Network), or a general-purpose interface such as Fibre Channel. Also, the interconnection network may comprise communication means for enabling communication with devices provided independently from the disk control device. For example, the SWs 6 may be configured as a network, such as a WAN, so that each of the disk control devices 200 can be installed at physically remote locations.

Detailed description will be made of the configurations of the DKC internal coupling (internal coupling) 3, the SW (first coupling unit) 5, which provides a "tight coupling," and the SW (second coupling unit) 6, which provides a "loose coupling."

In the present embodiment, the same protocol is used for both the SW 5 and the SW 6. Furthermore, the SW 5 and the SW 6 are configured as an extension of the DKC internal coupling 3.

Figure 2:
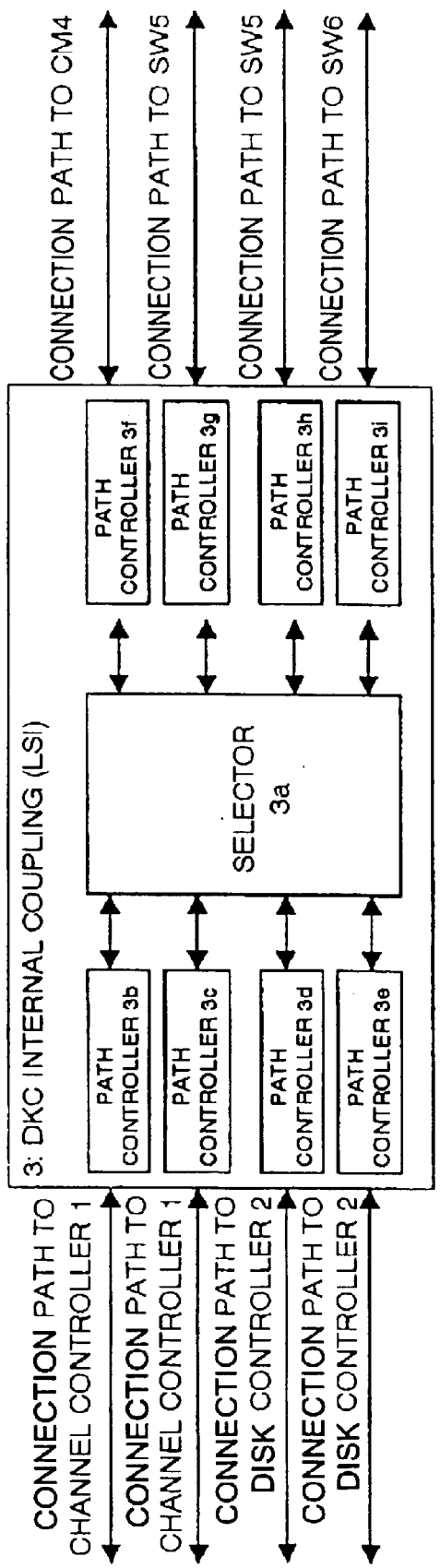
FIG. 2 is a block diagram showing a configuration of a DKC internal coupling 3 according to the embodiment.

FIG. 2 shows a block diagram of a DKC internal coupling 3 realized on an LSI. As shown in FIG. 2, the DKC internal coupling 3 comprises a selector 3a and path controllers 3b, 3c, 3d, 3e, 3f, 3g, 3h, 3i. The path controllers 3b through 3i are connected to the selector 3a. The path controllers 3b and 3c are connected respectively to the connection paths to the channel controllers 1 of the power supply clusters A and B shown in FIG. 1. The path controllers 3d and 3e are connected respectively to the connection paths to the disk controllers 2 of the power supply clusters A and B shown in FIG. 1. The path controller 3f is connected to the connection path to the CM 4 of the power supply cluster A, which the DKC internal coupling 3 belongs to, or to the CM 4 of the power supply cluster B. The path controllers 3g and 3h are connected respectively to the connection paths to the SWs 5 provided on the side of the power supply cluster A and the side of the power supply cluster B shown in FIG. 1. The path controller 3i is connected to the connection path to the SW 6 on the side of the power supply cluster A, which the DKC internal coupling 3 belongs to, or to the SW 6 on the side of the power supply cluster B. The operation of the DKC internal coupling 3 will be described later.

Figure 3:
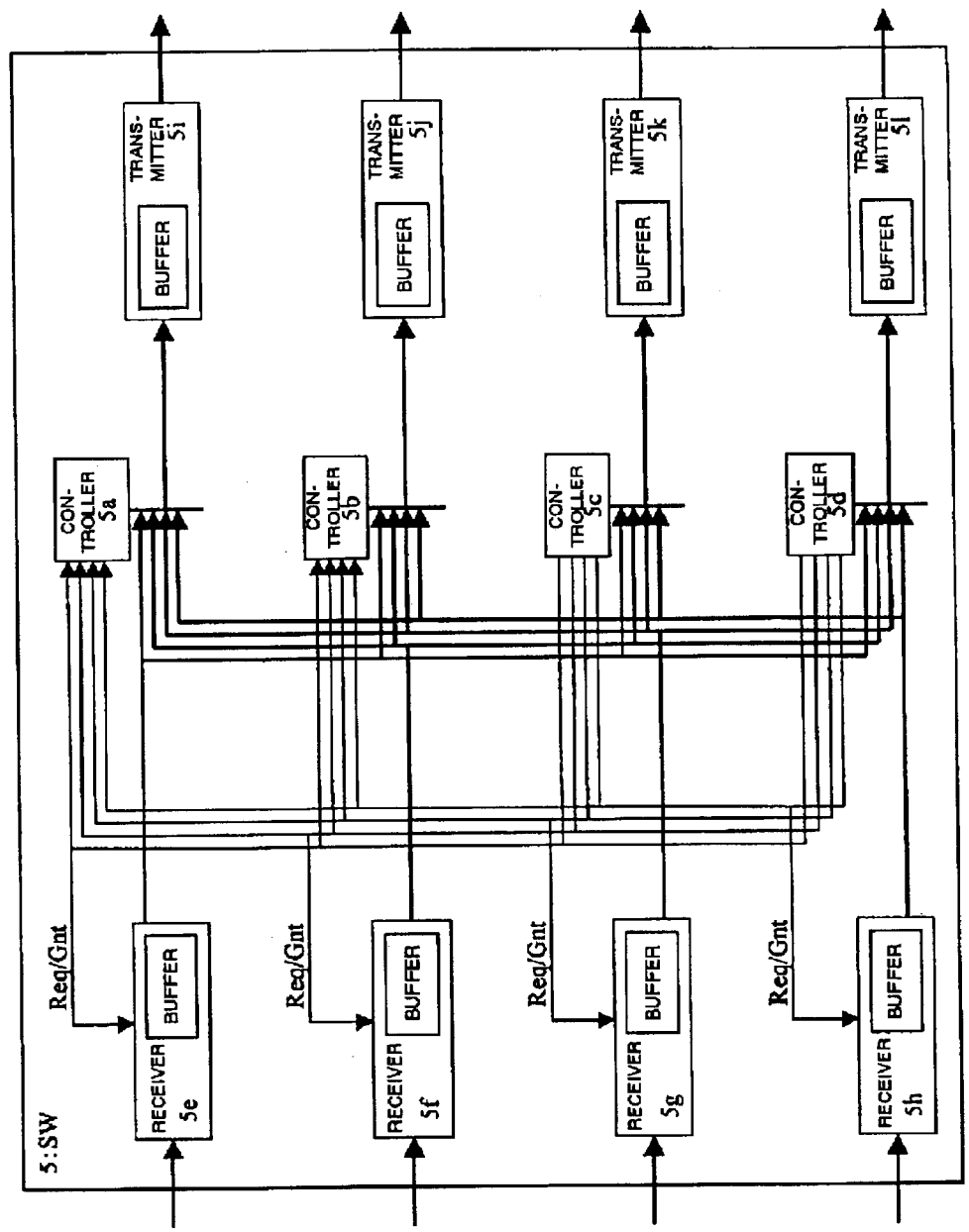
FIG. 3 is a block diagram showing a configuration of an SW 5 according to the embodiment.

FIG. 3 shows a block diagram of a SW 5 configured on an LSI. It should be noted that the hardware configuration of the SW 6 is the same as that of the SW 5 shown in FIG. 3. As shown in FIG. 1, each SW 5 is connected to the DKC internal couplings 3 of the power supply clusters A and B in two disk control units 100. That is, each SW 5 is connected to a total of four DKC internal couplings 3. Therefore, the SW 5 in FIG. 3 has four input ports and four output ports. The SW 5 includes four controllers 5a, 5b, 5c, 5d, four receivers 5e, 5f, 5g, 5h, and four transmitters 5i, 5j, 5k, 5l. Each of the receivers 5e through 5h is connected to one of the controllers 5a to 5d through data lines including a request/grant ID line Req/Gnt. Furthermore, each of the controllers 5a to 5d is connected to one of the transmitters 5i to 5l. Each of the receivers 5e to 5h is also connected to one of the transmitters 5i to 5l. Each of the receivers and the transmitters comprises a buffer.

Figure 4:
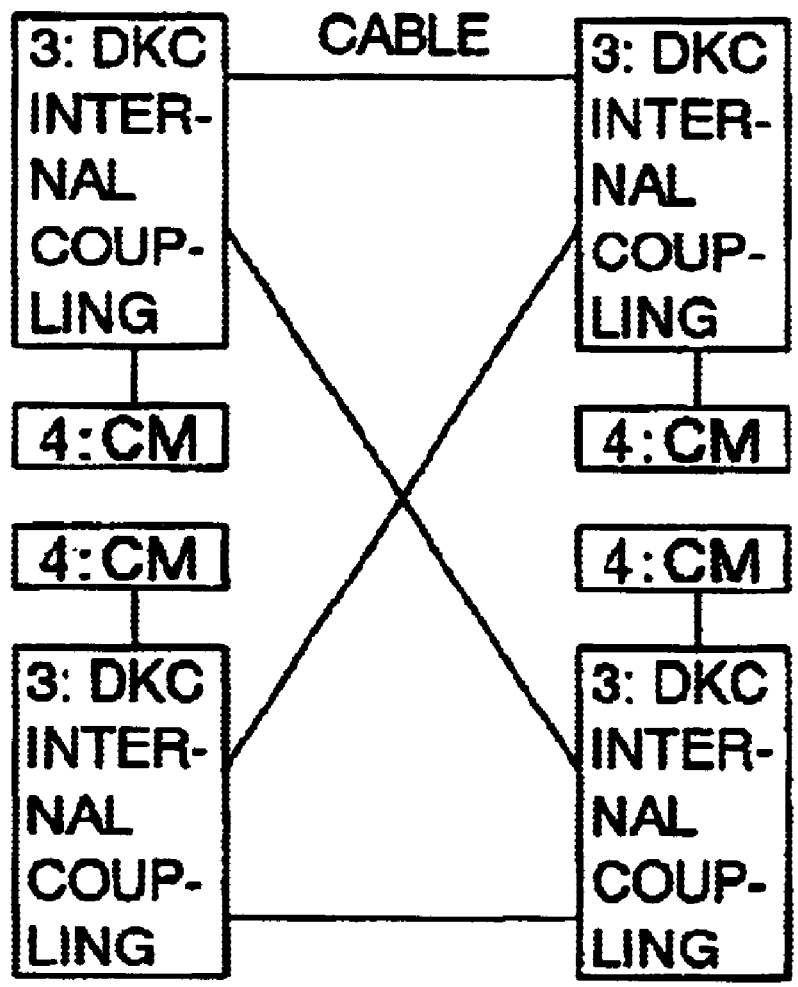
FIG. 4 is a block diagram showing another configuration of the SW 5 according to the embodiment.

FIG. 4 shows a block diagram of a SW 5 configured using cables. In FIG. 4, each SW 5 shown in FIG. 1 is configured using cable connections.

Figure 5:
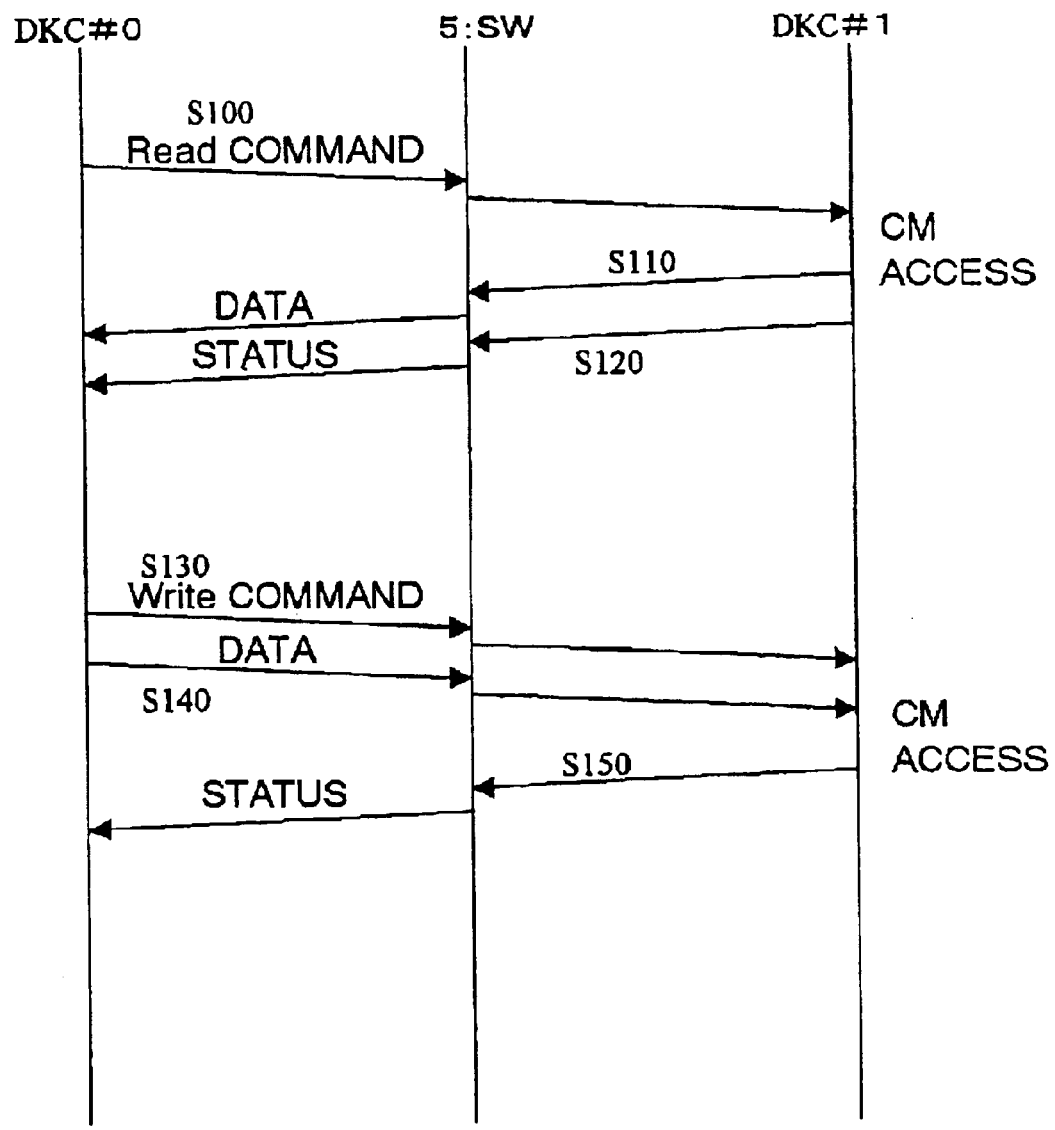
FIG. 5 is a flowchart showing how data, commands, etc. are exchanged between two disk control units 100 through the SW 5 according to the embodiment.

The operation of the SW 5 described above will be explained with reference to the flowchart shown in FIG. 5. In this specification, each of the steps in the flowcharts is indicated by the alphabet "S". FIG. 5 shows how data, commands, etc. are exchanged between the DKC internal couplings 3 of two disk control units 100 (DKC No. 0 and DKC No. 1), which are shown in FIG. 1, through a SW 5. Conceptually, the address to be accessed (e.g., the address of a CM 4 in one DKC No. 1) is set by another disk control unit 100 (for example, DKC No. 0), and this disk control unit 100 (DKC No. 0 in this case) directly accesses that address (e.g., the address of the CM 4 in DKC No. 1.)

Specifically, at step S100, the SW 5 transmits a Read command sent from the DKC No. 0 to the DKC No. 1. The Read command comprises a transfer destination CM address, a transfer source CM address, a transfer length, and the command name (or operational code) indicating "Read", as shown in FIG. 6A. At steps S110 and S120, when a CM 4 of the DKC No. 1 has been accessed, the DKC No. 1 sequentially transmits data and a status. The SW 5 relays the data and the status to the DKC No. 0. As shown in FIG. 6B, the data accompanies a transfer destination CM address, a transfer source CM address, and a transfer length. The data structure of the status is as shown in FIG. 6C.

On the other hand, upon receiving a "Write" command and data from the DKC No. 0, the SW 5 transmits the Write command and the data to the DKC No. 1 at steps S130 and S140. The data structures of the Write command and the data are similar as those shown in FIG. 6A and FIG. 6B, except that the command name (or operational code) "Read" shown in FIG. 6A is replaced with the command name "Write". At step S150, when a CM 4 of the DKC No. 1, which has received the Write command and the data, has been accessed, the DKC No. 1 transmits a status. Then, the SW 5 relays the status to the DKC No. 0. The data structure of the status is the same as that shown in FIG. 6C.

Figure 7:
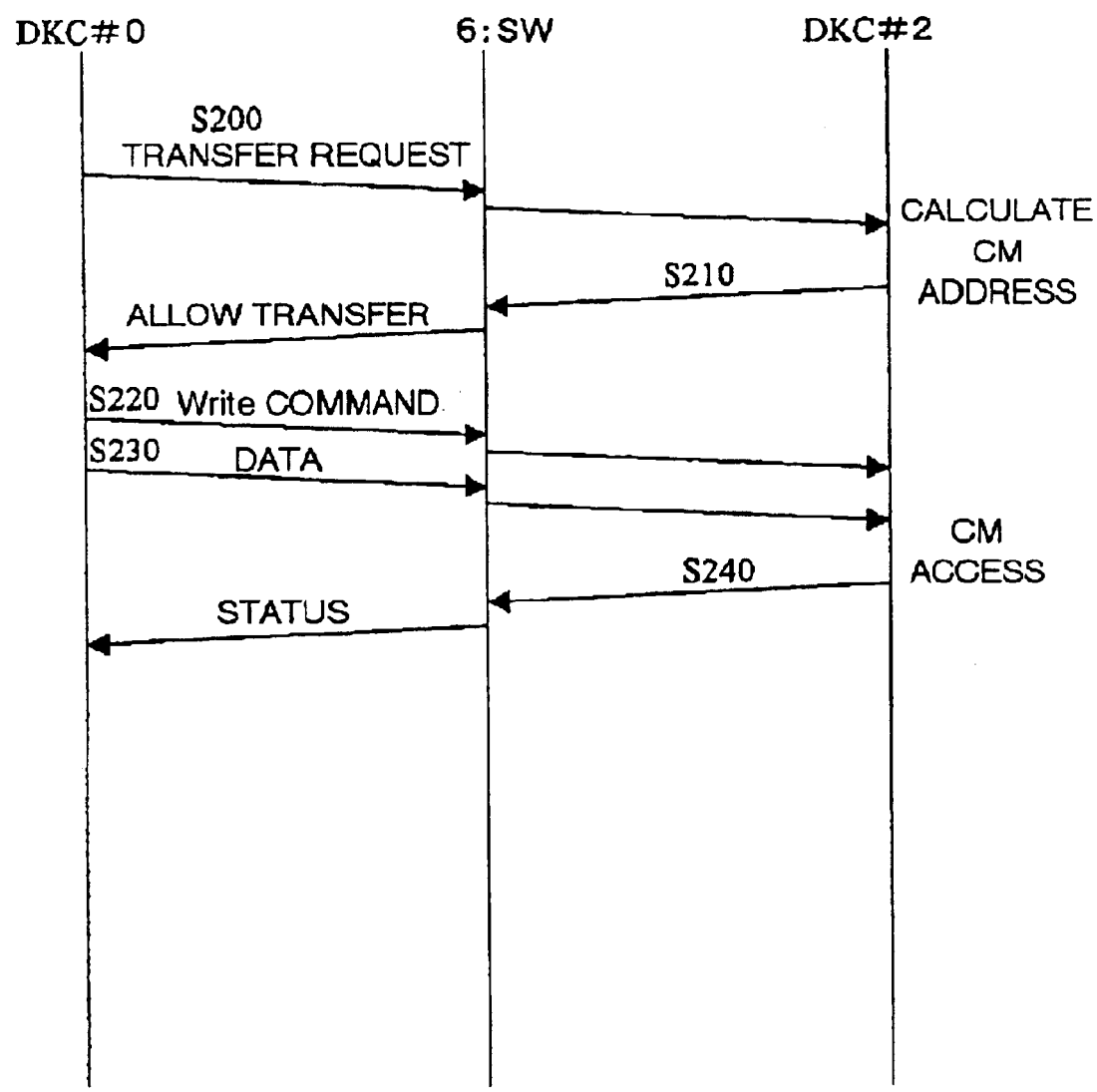
FIG. 7 is a flowchart showing how data, commands, etc. are exchanged between two disk control devices 200 through an SW 6 according to the embodiment.

The operation of the SW 6 described above will be explained below with reference to the flowchart shown in FIG. 7. FIG. 7 shows how data, commands, etc. are exchanged between the DKC internal couplings 3 of disk control units 100 (DKC No. 0 and DKC No. 2) of two disk control devices 200, which are shown in FIG. 1, through a SW 6. Conceptually, the channel controllers 1, the disk controllers 2, and the CMs 4 shown in FIG. 1 each comprises a processor for implementing such a function. With this arrangement, to carry out address management of the CMs 4, a request is sent from a DKC (for example, DKC No. 0) to another DKC (for example, DKC No. 2) to be accessed in order to obtain address setting information (for example, the address of its CM 4) through communications between the processors of the DKC No. 0 and the DKC No. 2 before transferring data. Then, the DKC (DKC No. 0) transfers data by designating the address to be accessed.

Specifically, upon receiving a command for requesting data transfer issued from the DKC No. 0, the SW 6 forwards the request to the DKC No. 2 at step S200. The request command comprises: an address designating a transfer destination processor; an address designating a transfer source processor; a transfer length; and the command name (or operational code) "Transfer Request", as shown in FIG. 8A. At step S210, the DKC No. 2 calculates an address for accessing its CM 4, and transmits the calculated address together with a transfer permit command. Upon receiving the address and the transfer permit command, the SW 6 forwards them to the DKC No. 0. As shown in FIG. 8B, the transfer permission command comprises a transfer destination processor address, a transfer source processor address, a transfer length, and the command name (or operational code) "Transfer Permission", as shown in FIG. 8(b). At steps S220 and 230, upon receiving the address and the transfer permit command, the DKC No. 0 sequentially transmits a Write command and data. Then, the SW 6 relays the Write command and the data to the DKC No. 2. The data structures of the Write command and the data are similar to those shown in FIG. 6A and FIG. 6B except that the command name "Read" shown in FIG. 6A is replaced with the command name "Write". At step S240, when a CM 4 of the DKC No. 2, which has received the Write command and the data, has been accessed, the DKC No. 2 transmits a status. The SW 6 forwards the status to the DKC No. 0. The data structure of the status is the same as that shown in FIG. 6C.

According to another embodiment of the present invention, the protocol used for the SW 6 is different from that for the SW 5. Specifically, in this example, the SW 6 is connected in the same way as the host channel. Access is realized through a SCSI command, etc. mapped on the fiber channel by use of a logical address. The SW 5, on the other hand, is configured as an extension of the DKC internal coupling 3, as described above. Furthermore, the operation of the SW 5 is also as described above. Therefore, the configuration and the operation of the SW 6, which have not yet been explained, will be mainly described.

Figure 9:
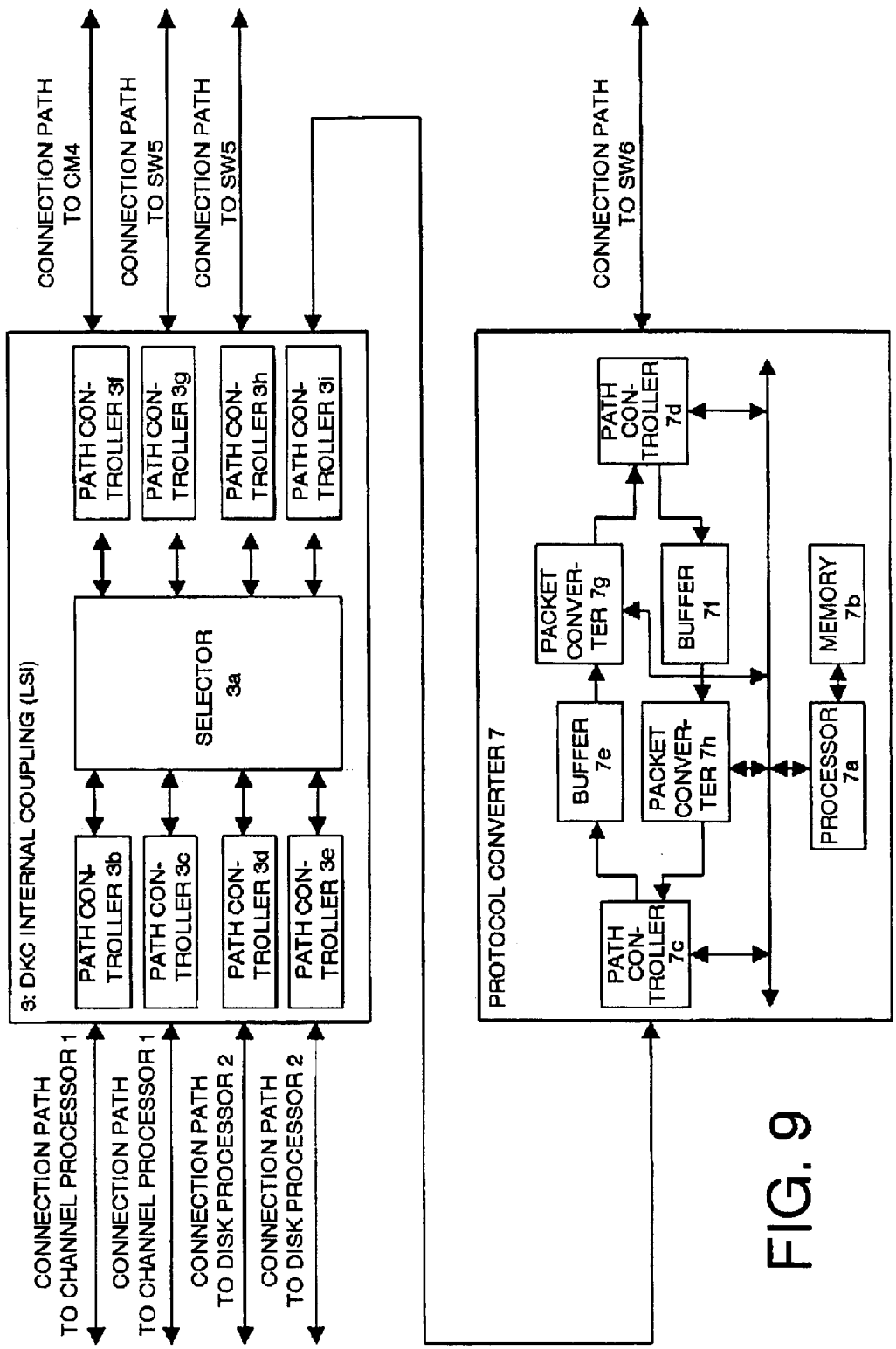
FIG. 9 is a block diagram showing configurations of a DKC internal coupling 3 and a protocol converter 7 according to another embodiment of the present invention.

Specifically, as shown in FIG. 9, a protocol converter 6 is added to the block diagram of FIG. 2 described above such that it is inserted between the path controller 3i and the connection path to the SW 6. Since the other sections of the configuration are the same as those shown in FIG. 2, only the protocol converter 6 will be explained. As shown in FIG. 9, the protocol converter 6 comprises a processor 7a, a memory 7b, path controllers 7c and 7d, buffers 7e and 7f, and packet converters 7g and 7h. The processor 7a, the memory 7b, the path controllers 7c and 7d, and the packet converters 7g and 7h are connected to a shared path. Data is transmitted from the DKC internal coupling 3 to the SW 6 by carrying out protocol conversion in the order of the path controller 7c, the buffer 7e, the packet converter 7g, and the path controller 7d under control of the processor 7a which uses the memory 7b as necessary. On the contrary, data is transmitted to the DKC internal coupling 3 through the SW 6, by carrying out protocol conversion in the order of the path controller 7d, the buffer 7f, the packet converter 7h, and the path controller 7c under control of the processor 7a which uses the memory 7b as necessary.

Figure 10:
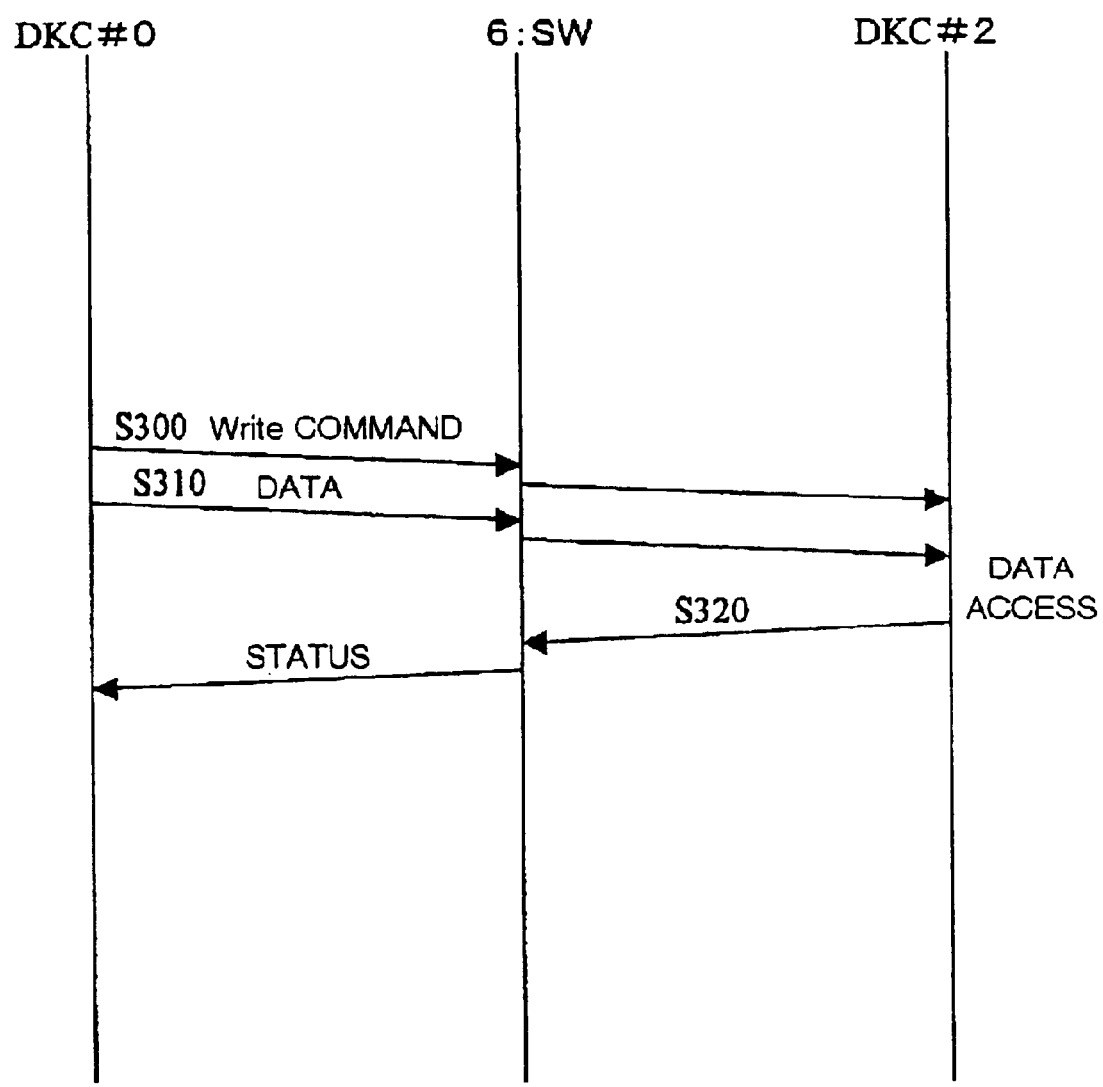
FIG. 10 is a flowchart showing how data, commands, etc. are exchanged between two disk control devices 200 through an SW 6 according to the embodiment.

The operation of the SW 6 described above will be explained below with reference to the flowchart shown in FIG. 10. FIG. 10 shows how data, commands, etc. are transferred between the DKC internal couplings 3 of disk control units 100 (for example, DKC No. 0 and DKC No. 2) of two disk controllers 200, which are shown in FIG. 1, through a SW 6. At steps S300 and S310, the DKC No. 0 sequentially transmits a Write command and data. Then, the SW 6 relays the Write command and the data to the DKC No. 2. Upon receiving this data access, the DKC No. 2 transmits a status through the SW 6 at step S320.

FIG. 11A, FIG. 11B, FIG. 11C show the data structures of the Write command, the data, and the status, respectively. The Write command comprises a transfer destination port address, a transfer source port address, a transfer length, the command name (or operational code) "Write", a logical address, and a transfer size, as shown in FIG. 11A. The data accompanies a transfer destination port address, a transfer source port address, and a transfer length, as shown in FIG. 11B. The status comprises a transfer destination port address, a transfer source port address, a transfer length, and status information, as shown in FIG. 11C.

Figure 12A:
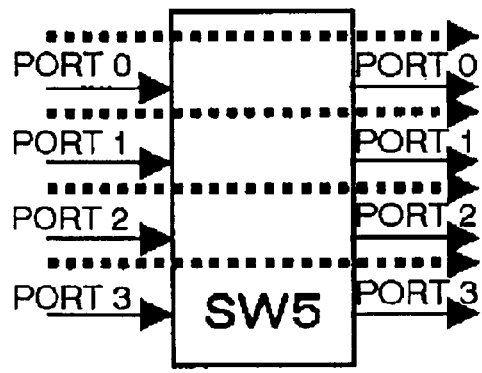
FIGS. 12A and 12B are schematic diagrams showing general characteristics of SWs 5 according to embodiments of the present invention and conventional art.
Figure 12B:
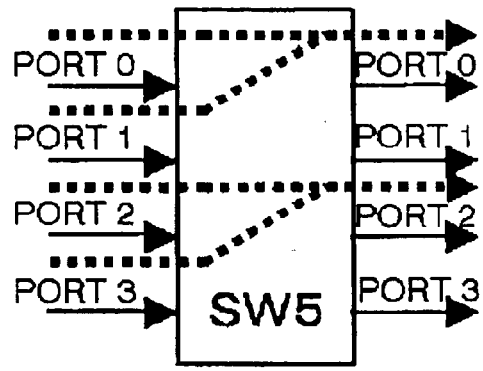
Figure 13A:
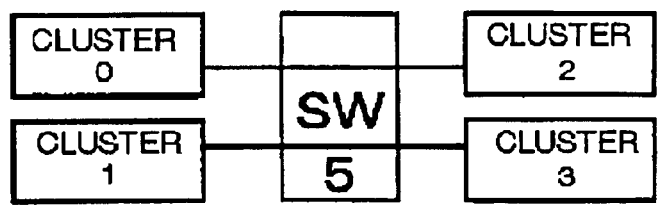
FIG. 13A is a block diagram showing the connection configuration of the SW 5.
Figure 13B:
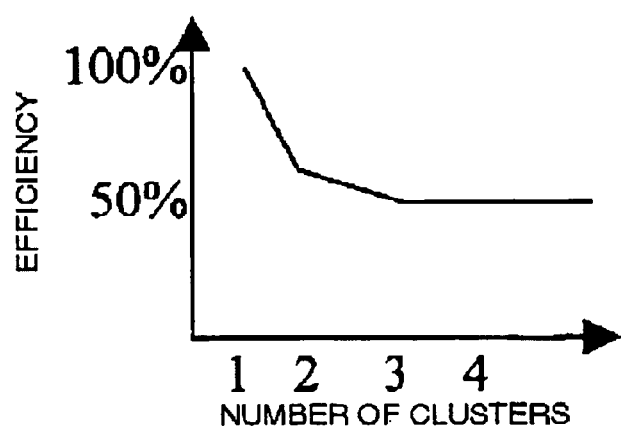
FIG. 13B is a graph showing the relationship between the number of connected clusters and efficiency.
Figure 14:
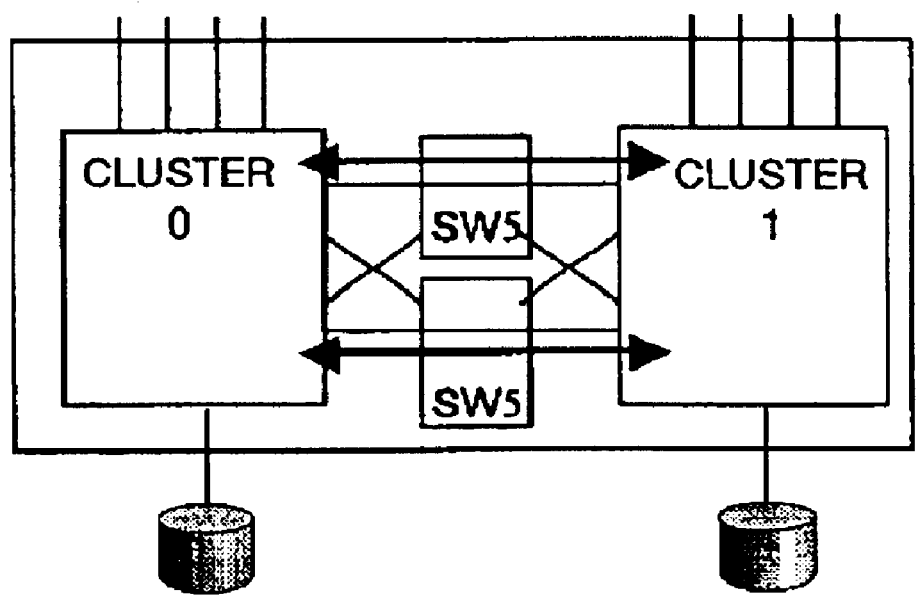
FIG. 14 is a block diagram showing how disk control units (clusters) are connected according to another embodiment of the present invention.

Description will be made of general characteristics of the SW 5 employed in the embodiments described above. In FIG. 12A, the input ports 0 to 3 of the SW 5 correspond to the output ports 0 to 3, respectively, providing high data transfer efficiency. In FIG. 12B, on the other hand, the input ports 0 to 3 of the SW 5 do not have a one-to-one relationship in view of the output ports 0 to 3. In this case, both the input ports 0 and 1 correspond to the output port 0, and both the input ports 2 and 3 correspond to the output port 2. Thus, logical contention occurs in data transfer with a probability of approximately 50%, and therefore, only 50% of the hardware capability can be utilized. Thus, the data transfer efficiency is kept low. That is, the efficiency becomes lower as the number of clusters (corresponding to disk control units 100 in FIG. 1) connected to the SW 5 increases, as shown in the graph of FIG. 13B. For example, if a plurality of cluster pairs are connected to the SW 5 as shown in FIG. 13A, the efficiency is reduced to 50%. Since the efficiency is reduced, it is necessary to employ a broader bandwidth, which would lead to increased cost.

To solve the above problem, according to the present invention, two clusters (disk control units 100) are made to configure a single disk control device 200, and these two clusters are connected through the SWs 5. Since this arrangement (one cluster combination) corresponds to the case of "one cluster" in FIG. 13B, it is possible to obtain an efficiency of 100%.

Figure 15:
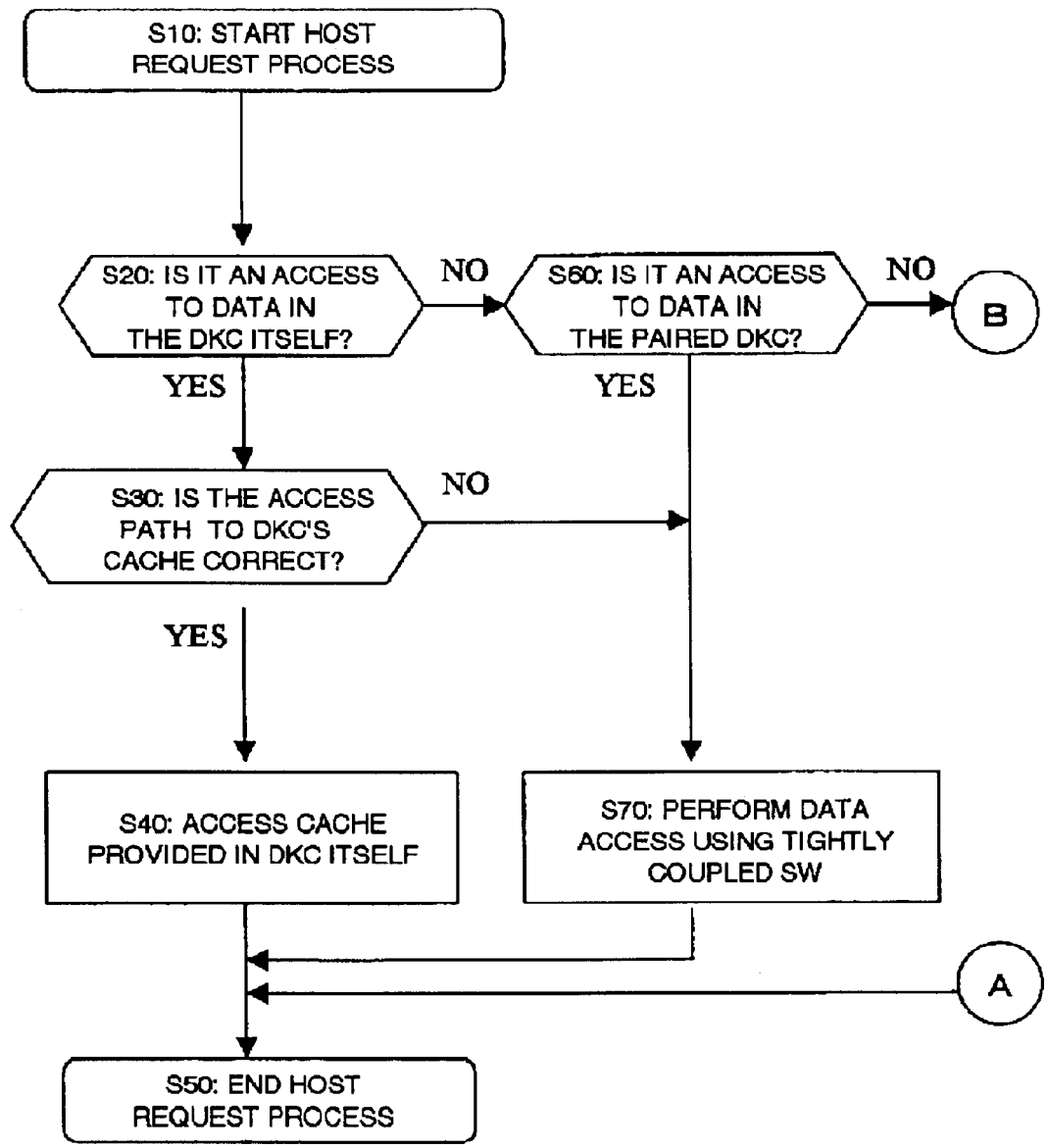
FIG. 15 is a flowchart showing some operations of a disk system according to the embodiment of the present invention.

Description will be made below of the overall operation of a disk system employing the disk control system 1000, the host computers 300, and the disk devices 400 described above, with reference to the flowcharts shown in FIG. 15 and FIG. 16. Also refer to the block diagram of FIG. 1 as necessary. It should be noted that in the figures, the alphabet "S" indicates each "step". First of all, a host computer 300 requests processing (such as Read/Write processing) at S10, as shown in FIG. 15. At S20, the disk control unit 100 connected to the host computer 300 determines whether the host computer 300 is requesting access to its cache memory 4. If it is determined that the host computer 300 is requesting access to its cache memory 4, the disk control unit 100 further determines whether the access path is valid at S30. If it is determined that the access path is valid, at S40 and S50, the disk control unit 100 accesses its cache memory 4 and carries out the requested Read/Write data processing, and the process is ended.

If it is determined at S20 that the requested processing does not require access to data stored in the cache memory 4 of the disk control unit 100 ("NO" at S20), the disk control unit 100 further determines whether the requested processing requires access to the other disk control unit 100 (the other one in the power supply clusters A or B) within the same disk control device 200, at S60. If it is determined that the requested processing requires access to the other disk control unit 100 ("YES" at S60), the disk control unit 100 accesses the cache memory 4 of the other disk control unit 100 through the SW 5 and the DKC internal coupling 3 provided on the side of the other disk control unit 100 at S70.

It should be noted that the processing at S70 is also carried out if it is determined at S30 that the access path is not valid. For example, assume that a failure has occurred in the communication path from the channel controller 1 to the cache memory 4 through the DKC internal coupling 3 on the "power supply cluster A" side. In this case, the channel controller 1 of the power supply cluster A is connected to the DKC internal coupling 3 of the power supply cluster B. Then, the DKC internal coupling 3 of the power supply cluster B accesses the cache memory 4 in the power supply cluster A through the SW 5 provided on the side of the power supply cluster A and through the DKC internal coupling 3 in the power supply cluster A. Formation of such a detour can enhance failure tolerance.

Figure 16:
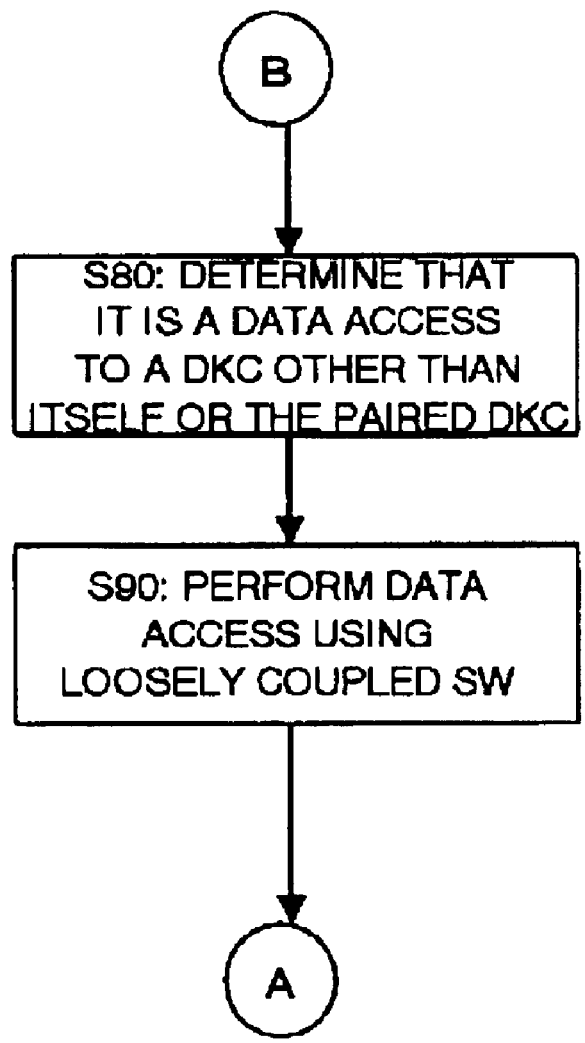
FIG. 16 is flowchart showing some of the operations of the disk system according to the embodiment.

On the other hand, if it is determined at S60 that the requested processing does not require access to the other disk control unit 100 ("NO" at S60), the processing B shown in FIG. 16 is carried out. In the processing B, at S80, it is determined that the requested processing requires access to the other disk control device 200. Then, the cache memory 4 is accessed through the SW 6 by way of a DKC internal coupling 3, and data is transferred therethrough.

The present embodiment employs the first coupling unit for interconnecting the internal couplings provided in each of the disk control units in each disk control device to read/write data. In addition, data may be transferred through a second coupling unit for interconnecting the internal couplings of the disk control units provided in different disk control devices (so as to bridge between the disk control devices).

That is, the first coupling unit providing a tight coupling can be used to read/write data, while the second coupling unit providing a loose coupling can be used to transfer data. Such a coupling configuration in which each of the two coupling units provides an individual service can enhance the scalability without leading to increased cost.

What is claimed is:

1. A disk control system comprising:

a plurality of disk control devices, each of said disk control devices including a plurality of disk control units and at least one first coupling unit; and at least one second coupling unit provided between said disk control devices;

wherein each of said disk control units includes:

at least one channel controller having an interface to a host computer;

at least one disk controller having an interface to a disk device; and an internal coupling for connecting said channel controller, said disk controller, and a cache memory for temporarily storing data to be written to or read from said disk device;

wherein said first coupling unit of each disk control device connects said internal couplings of its constituent disk control units in order to read or write data within said each disk control device; and wherein said second coupling unit connects said internal couplings of said disk control units among all of said disk control devices in order to transfer data among said disk control devices.

2. A disk control system according to claim 1, wherein:

the number of said disk control units that each of said disk control devices comprises is two; and said first coupling unit connects said internal couplings of said two disk control units.

3. A disk control system according to claim 1, wherein said first coupling unit, said second coupling unit, or both of said first coupling unit and said second coupling unit is structured using a memory path switch.

4. A disk control system according to claim 1, wherein said first coupling unit is structured using data transmission cables.

5. A disk control system according to claim 1, wherein said first coupling unit connects said disk control units that are provided in the same disk control device and are energized by a shared power supply.

6. A disk control system according to claim 1, wherein said first coupling units provided in each of said disk control devices are connected to transfer data between said disk control devices.

7. A disk system comprising:

a disk control system; and at least one host computer connected to said disk control system for exchanging data;

wherein said disk control system comprises:

a plurality of disk control devices, each of said disk control devices including a plurality of disk control units and at least one first coupling unit; and at least one second coupling unit to provide data communication among said disk control devices;

wherein each of said disk control units includes:

at least one channel controller having an interface operable for communication with a host computer;

at least one disk controller having an interface operable for communication with a disk device; and an internal coupling for connecting said channel controller, said disk controller, and a cache memory for temporarily storing data to be written to or read from said disk device;

said first coupling unit in a given disk control device providing data communication among said internal couplings of its disk control units to read or write data within said disk control device;

said second coupling unit providing data communication among said internal couplings of all of said disk control units provided among said disk control devices to transfer data among said disk control devices; and said at least one host computer is connected to said disk control system via a channel controller of one of said disk control units.

8. A disk system comprising:

a disk control system; and at least one disk device connected to said disk control system for storing data;

wherein said disk control system comprises:

a plurality of disk control devices, each of said disk control devices including a plurality of disk control units and at least one first coupling unit; and at least one second coupling unit provided between said disk control devices;

wherein each of said disk control units includes:

at least one channel controller to interface to a host computer;

at least one disk controller to interface to a disk device; and an internal coupling that provides a data connection among said channel controller, said disk controller, and a cache memory for temporarily storing data to be written to or read from said disk device;

said first coupling unit connects said internal couplings of said disk control units provided in the same disk control device to read or write data within that disk control device;

said second coupling unit connects said internal couplings of said disk control units provided among said disk control devices to transfer data among said disk control devices; and said at least one disk device is connected to said disk control system via a disk controller of one of said disk control units.

9. A disk control device comprising:

a plurality of disk control units; and at least one first coupling unit;

wherein each of said disk control units includes:

at least one channel controller having an interface to a host computer;

at least one disk controller having an interface to a disk device; and an internal coupling for connecting said channel controller, said disk controller, and a cache memory for temporarily storing data to be written to or read from said disk device;

said first coupling unit providing a data connection among said internal couplings of said disk control units provided in said disk control device to read or write data within said disk control device; and said internal coupling of each of said disk control units being configured for connection to at least one internal coupling of another disk control device by at least one second coupling unit in order to transfer data among a plurality of disk control devices.

10. A disk control device according to claim 9, wherein:

the number of said disk control units that said plurality of disk control devices comprises is two; and said first coupling unit connects said internal couplings of said two disk control units.

11. A disk control device according to claim 9, wherein said first coupling unit, said second coupling unit, or both of said first coupling unit and said second coupling unit is structured using a memory path switch.

12. A disk control device according to claim 9, wherein said first coupling unit is structured using data transmission cables.

13. A disk control device according to claim 9, wherein said first coupling unit connects said disk control units that are energized by a shared power supply.

14. A disk control device according to claim 9, wherein said first coupling unit provided in said disk control device is connected to at least one first coupling unit provided in another disk control device to transfer data among a plurality of disk control devices.

15. A method for controlling data communications for a disk control device, said disk control device comprising a plurality of disk control units, each of said disk control units including at least one channel controller having an interface to a host computer, at least one disk controller having an interface to a disk device, and an internal coupling for connecting said channel controller, said disk controller, and a cache memory for temporarily storing data to be written to or read from said disk device, said method comprising the steps of:

reading or writing data within said disk control device using a first coupling unit for connecting said internal couplings of said disk control units; and transferring data among a plurality of disk control devices using a second coupling unit for connecting said internal couplings of said disk control units to at least one internal coupling of another disk control device.

16. A method according to claim 15, wherein:

the number of said disk control units that said disk control device comprises is two; and said first coupling unit connects said internal couplings of said two disk control units.

* * * * *